United States Patent Office 3,449,268
Patented June 10, 1969

3,449,268
PROCESS FOR MAKING FOAMABLE
ISOTACTIC POLYSTYRENE
Norman E. Scheffler, Midland, Mich., assignor to The
Dow Chemical Company, Midland, Mich., a corporation of Delaware
No Drawing. Filed May 31, 1966, Ser. No. 553,641
Int. Cl. C08f 47/10, 33/02
U.S. Cl. 260—2.5     10 Claims

ABSTRACT OF THE DISCLOSURE

The invention concerns a process of integrating a volatile organic fluid into a isotactic amorphous aromatic polymer in aqueous suspension to obtain a foamable isotactic amorphous vinyl aromatic polymer.

---

This invention concerns a process for making foamable isotactic polystyrene. It relates more particularly to improvements in a process for integrating a volatile organic fluid into an isotactic polystyrene and expanding said polystyrene to produce an isotactic foam.

It is known to prepare cellular isotactic polystyrene. For example, British Patent No. 938,639 makes compositions, convertible into cellular isotactic polystyrene by the action of heat, by integrating methylene chloride or a halogenated aromatic hydrocarbon such as chlorobenzene or p-chlorotoluene with finely divided acetone-insoluble isotactic polystyrene under elevated pressure and temperatures and suddenly releasing the pressure. Canada Patent No. 694,380 corresponds to the above British patent.

It has now been discovered that foamable isotactic polystyrene can readily be obtained by contacting isotactic polystyrene in amorphous condition at temperatures above its crystalline melting point with vapors of a volatile organic fluid that dissolves in the polymer, but in which the polymer is insoluble or is slightly swelled, then cooling the polymer containing the volatile organic fluid at a rate greater than the rate of crystallization of the isotactic polystyrene.

It is important that the isotactic polystyrene be in amorphous or substantially amorphous form, i.e., consisting of not more than 10 percent by weight of crystalline polymer as determined by X-ray diffraction methods, when it is contacted with vapors of the volatile organic fluid, or after integrating said fluid into the polystyrene, in order to make foamable isotactic polystyrene compositions. The isotactic polystyrene is preferably in amorphous form when it is contacted with the volatile organic fluid at temperatures above its crystalline melting point.

It is important that the integrated polymer be quickly cooled under pressure, preferably by quenching in a cold aqueous non-solvent liquid, to a temperature of about 90° C. or below, after which it can be cooled to room temperature or thereabout in usual ways before release of the pressure and separating of the polymer from the aqueous liquid. The integrated polymer can readily be cooled or quenched by mixing the hot aqueous slurry or suspension of the polymer particles with from two to ten times or more its volume of cold aqueous liquid, e.g., water, under pressure.

The foregoing procedure usually results in a composition of foamable isotactic polystyrene in amorphous condition which is capable of expanding upon heating, to form a cellular amorphous isotactic body of low density which cellular body can readily be converted to its crystalline condition upon heating at elevated temperatures, e.g., by heating in air at temperatures between about 125° to 200° C.

A preferred isotactic polystyrene is one having a melting point of 200° C. or above, and shows in the crystalline condition at least 20% crystallinity on X-ray examination.

The volatile organic fluid foaming agent can be an aliphatic hydrocarbon, a cycloaliphatic hydrocarbon, or an aliphatic or cycloaliphatic halohydrocarbon, in which at least one of the halogen atoms is a fluorine atom and which aliphatic-, cycloaliphatic- or halohydrocarbon boils at a temperature below 100° C. at 760 millimeters of Hg absolute pressure. Among suitable compounds are: saturated aliphatic and cycloaliphatic hydrocarbons such as butane, isobutane, pentane, isopentane, neopentane, hexane, dimethylbutane, and aliphaitc and cycloaliphatic halohydrocarbons such as

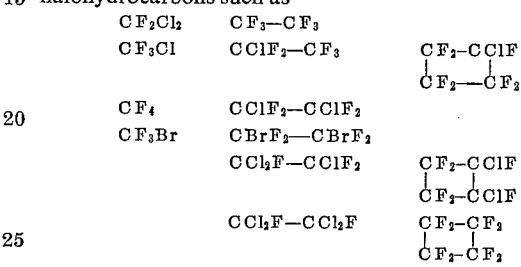

Mixtures of any two or more such volatile organic compounds can also be used.

The volatile organic compound or mixture of compounds to be used as the blowing agent is usually employed in an amount exceeding the quantity that is desired in the final product in order to readily, rapidly and efficiently integrate said agent(s) into the isotactic polystyrene in amorphous or substantially amorphous condition. In general, an amount of the volatile compound corresponding to from two to ten times or more than desired in the final product is used. The final product can contain from about 0.05 to 0.5 gram molecular proportion of the volatile organic compound per 100 grams of the isotactic polystyrene initially used.

The isotactic polystyrene in amorphous condition can readily be obtained by feeding granular crystalline polystyrene to a plastics extruder wherein it is pressed, heated to a temperature above its crystalline melting point and is extruded, preferably as a strand or a plurality of strands and is quenched, suitably by contacting, e.g., immersing or spraying the extruded strands with cold water, then is cut or ground to a granular form.

The granular isotactic polystyrene in amorphous condition is suspended in an aqueous medium, preferably containing a finely divided water insoluble inorganic suspending agent such as magnesium carbonate, zinc oxide, calcium phosphate, or hydroxyapatite, and preferably a small amount, e.g., from about 0.001 to 0.1 percent based on the weight of the water, of an anionic or an amphoteric surface active agent. The mixture is stirred and heated in a suitable pressure resistant vessel to a temperature above the crystalline melting point of the isotactic polystyrene preferably at temperatures between about 210° and 260° C. Thereafter, the volatile organic fluid blowing agent(s) is added under pressure to the aqueous suspension in the pressure resistant vessel and in the desired amount. Stirring and heating of the mixture is continued until the volatile organic fluid is integrated into the polymer in the desired proportion. Thereafter, the mixture is rapidly cooled to a temperature of 100° C. or below, and at a rate greater than the rate of crystallization of the isotactic polystyrene. The mixture is usually cooled to about 40° C. or below before releasing the pressure and/or opening the vessel and removing the product.

In a preferred practice, the pressure is maintained on the polystyrene beads having the volatile organic fluid blowing agent integrated therewith at a pressure of from about 300 to 2500 p.s.i.g., by means of an inert gas such as nitrogen, helium, or argon, to inhibit or reduce the loss of volatile organic fluid from the individual polystyrene granules during cooling of the same.

In an alternative and preferred procedure, the isotactic polystyrene particles in amorphous condition are suspended in an aqueous medium and contacted with vapors of the volatile organic compound at temperatures above about 220° C., e.g., at from about 220° to 240° C., to integrate the organic compound into the polystyrene particles, after which the integrated polymer is quenched or rapidly cooled by mixing, feeding, or blending the hot aqueous suspension into admixture with a total of from about two to ten times its volume of aqueous liquid such as a volume of water at room temperature of thereabout, and under pressure approximately equal to the pressure in the reaction vessel containing the hot dispersion of the integrated polystyrene particles and aqueous medium. By such procedure the integrated polystyrene is rapidly cooled at a rate greater than its rate of crystallization, and amorphous isotactic polystyrene particles containing the volatile organic compound uniformly distributed throughout are obtained. Such amorphous isotactic polystyrene compositions are capable of expanding upon heating and form cellular articles composed for the most part of individually-closed thin-walled cells.

The integrated polymer granules containing the volatile organic fluid are usually washed or slurried with an aqueous acidic solution of hydrochloric or sulfuric acid having a pH of about 2, to remove residual traces of the insoluble inorganic suspending agent, then are washed with water and are dried in air to about room temperature.

The isotactic polystyrene product is capable of expanding to a cellular body when heated, or of forming a cellular article, when granules of the product are heated in a porous mold that permits the escape of gases but retains the polymer. The foam or expanded polymer is usually in amorphous or substantially amorphous condition. It can readily be converted to its crystalline condition by aging or heating the same, suitably in an air oven at temperatures below its crystalline melting point, e.g., at from about 125° to 200° C.

The foam in crystalline condition can be used for insulating high temperature pipes and other high temperature objects. It can also be used for making articles or products where buoyancy at high temperatures is necessary or where resistance to the action of organic solvents is required.

The following examples illustrate ways in which the principle of the invention has been applied, but are not to be construed as limiting its scope.

EXAMPLE 1

(A) Isotactic polystyrene having a relative crystallinity of 28% as determined by X-ray diffraction measurements was heated and extruded at a temperture of about 280° C. as a strand of 0.02 inch diameter and was quenched in water at about 20° C. The cooled strand was cut into segments or particles about 0.08 inch long. The extruded and quenched isotactic polystyrene had a molecular weight of 510,000 as determined by intrinsic viscosity measurements, and was in amorphous form, i.e., it was free from crystallinity, by X-ray determination.

(B) A charge of 200 grams of the isotactic polystyrene particles in amorphous form was placed in a 2 liter pressure resistant stainless steel reaction vessel, together with 450 ml. of water containing 13.5 grams of finely divided magnesium carbonate and 0.09 gram of sodium lauryl sulfate as dispersing and wetting agents. The mixture was stirred and was heated to a temperature of 220° C. Thereafter, n-pentane was fed under pressure at a rate of 10 ml. per minute to the reaction vessel for a period of 20 minutes. A total of 200 ml. of pentane was added. The pressure in the reaction vessel was 730 p.s.i. gauge pressure. The mixture was stirred and heated at 220° C. for 15 minutes longer, then was cooled to 75° C. in a period of 10 minutes while feeding nitrogen gas to the reaction vessel in amount sufficient to maintain a gauge pressure of 700 p.s.i. therein. The mixture was cooled to about room temperature, after which the reaction vessel was vented, then was opened, and the polymer beads recovered. The beads were washed with an aqueous acidic solution having a pH of about 2, then with water and were dried in air at room temperature for a period of 48 hours. The polystyrene beads contained 8.6 percent by weight of n-pentane and were free from crystallinity.

(C) The isotactic polystyrene beads in amorphous form containing n-pentane prepared in part B were heated in a prefoamer with steam at atmospheric pressure for a period of 1.5 minutes. The beads foamed to a bulk density of 1.8 pounds per cubic foot of the beads. The prefoamed beads were aged in air at room temperature for a period of 24 hours. The prefoamed and aged polystyrene beads were free from crystallinity.

(D) A portion of the prefoamed and aged isotactic polystyrene beads in amorphous form prepared in part C were used to fill a porous mold having a cavity of 12 x 12 inches square by 2 inches deep. The prefoamed beads were heated in the closed porous mold with steam at 30 pounds per square inch gauge pressure for a period of 42 seconds. The mold was cooled and the foam was removed. The product was a white foam block having a density of 1.8 pounds per cubic foot. The foam was free from crystallinity. The foam was insoluble in methyl ethyl ketone, acetone and ethyl acetate. The foam was thermally stable at a temperature of 146° C.

(E) Test pieces were cut from the isotactic polystyrene foam block prepared in part D. These test pieces were placed in an air oven and annealed or heated in air at a temperature of 155° C. for a period of 1.75 hours. Thereafter, the test pieces of foam were removed from the oven and allowed to cool to room temperature. The annealed foam had a relative crystallinity of 22.8 percent, by X-ray determination. The foam thermally stable at a temperature of 200° C. It was insoluble in toluene and benzene.

EXAMPLE 2

Isotactic polystyrene having a molecular weight of about 170,000 was heated and extruded as a strand which was quenched in water and was cut into granules, employing procedure similar to that employed in part A of Example 1. The granular polystyrene was in amorphous form, i.e., it was free from crystallinity. A charge of 200 grams of the granular amorphous polystyrene was suspended in water containing magnesium carbonate and sodium lauryl sulfate. The polymer was heated and stirred in a pressure resistant vessel to a temperature of 220° C. thereafter, a mixture of 70% 2,2-dimethylbutane and 30% n-pentane was added at a rate of about 10 ml. per minute until a total of 200 ml. of the mixture of the aliphatic hydrocarbons was added. The pressure reached a maximum of about 650 p.s.i. gauge. The resulting mixture was stirred and heated at 220° C. for 24 minutes longer. The reaction vessel was cooled to 75° C. in a period of 10 minutes while adding nitrogen gas to maintain a pressure therein of 650 p.s.i. The vessel was then cooled to room temperature and vented. The product was recovered and was washed with aqueous acidic solution, then with water, and was dried in air at room temperature. The product was in the form of rounded beads containing 6.6% 2,2-dimethyl butane and 2.2% n-pentane by analysis. The polystyrene beads were free from crystallinity. A portion of the polystyrene beads was heated with steam at atmospheric presure for 1.5 minutes. The beads foamed to a bulk density of 1.25 pounds per cubic foot of the foamed beads. The prefoamed beads were aged in air at room temperature for 24 hours. The aged prefoamed beads were free from crystallinity. They were heated in a porous mold for 10 seconds with steam at 30 p.s.i. gauge pressure then cooled and the foam product removed. The product was a white foam block having a density of 1.2 lbs./cu. ft. The foam was free from crystallinity. A test piece cut from the foam was heated in an oven at 110° C. for 2.5 hours, then at 150° C. for 0.5 hour. The heated foam had a relative crystallinity of 21.6%. A portion of the prefoamed amorphous isotactic polystyrene beads having a bulk density of 1.25 lbs./cu. ft. were heated in an oven at 110° C. for 2.5 hours, then, at 150° C. for 0.5 hour. The heated prefoamed polystyrene beads had a relative crystallinity of 21 percent. The prefoamed isotactic polystyrene beads in their crystalline form are useful fillers in the preparation of low density products, e.g., the manufacture of low density cementitious products such as cement blocks, plaster, or drywall plaster board.

EXAMPLE 3

(A) A charge of 200 grams of extruded isotactic polystyrene in amorphous form and having a molecular weight of about 170,000, which extruded polystyrene was in the form of segments of extruded rods having the dimensions of 0.4 millimeter in diameter by 2.5 millimeters long, was placed in a 2-liter stainless steel pressure resistant vessel equipped with a stirrer and valved inlets and means for heating and cooling the same. The polystyrene particles were suspended in 450 ml. of water containing 13.5 grams of magnesium carbonate in finely divided form and 0.09 gram of sodium lauryl sulfate "Duponol ME" as dispersing and wetting agents, respectfully. The mixture was stirred and was heated to a temperature of 220° C. after which a charge of 200 ml. of a mixture of 30 parts by volume of n-pentane and 70 parts by volume of 2,2-dimethylbutane were added to the stirred and heated polystyrene over a period of 1 hour and 15 minutes. Thereafter, the mixture was quickly cooled to a temperature of 75° C., then to room temperature and the polymer recovered. It was analyzed and was found to be free from crystallinity and to contain 2.3 percent by weight of pentane and 6.4 percent by weight of 2,2-dimethylbutane. A portion of the polystyrene granules was heated for 5 minutes at a temperature of 110° C. The polymer particles expanded to cellular bodies having a volume of 70 times their initial or unfoamed volume.

EXAMPLE 4

A charge of 200 grams of extruded isotactic polystyrene in amorphous form and similar to that employed in Example 3 is placed in a 2-liter stainless steel vessel and contacted with 200 ml. of n-pentane in an aqueous suspension under pressure at 220° C. employing procedure similar to that employed in Example 3. Thereafter, the hot aqueous suspension of the integrated polystyrene particles under pressure of about 700 p.s.i.g. is discharged from the reaction vessel through a valved inlet into admixture with four times its volume of cold at about 20° C. maintained under a pressure of about 600 p.s.i.g., in a pressure resistant vessel equipped with a stirrer. The polystyrene particles are almost immediately quenched to a temperature of about 60° C. The polymer is further cooled in the closed vessel to about room temperature, then recovered. The integrated polymer product expands to a cellular body upon heating at elevated temperatures.

I claim:
1. A process for making a foamable substantially amorphous isotactic vinyl aromatic polymer, which process comprises contacting particles of an isotactic vinyl aromatic polymer in amorphous condition at a temperature between its crystalline melting point and its decomposition temperature with an aqueous diffusion mixture consisting essentially of water in admixture with a suspending agent and a volatile organic fluid selected from the group consisting of (a) aliphatic and cycloaliphatic hydrocarbons, and (b) aliphatic and cycloaliphatic halohydrocarbons containing at least one fluorine atom in the molecule and (c) mixtures of (a) and (b), boiling below 100° C. at atmospheric pressure and in which said polymer is insoluble under pressure, integrating from about 0.05 to about 0.5 grams molecular proportion of said volatile organic fluid into 100 parts by weight of said polymer particles, then cooling the mixture to a temperature of below 100° C. at a rate that is greater than the rate of crystallization of the integrated polymer under the conditions employed.
2. A process as claimed in claim 1, wherein the isotactic vinyl aromatic polymer is isotactic polystyrene.
3. A process as claimed in claim 1, wherein the volatile organic fluid is pentane.
4. A process as claimed in claim 1, wherein the volatile organic fluid is neopentane.
5. A process as claimed in claim 1, wherein volatile organic fluid is dimethylpentane.
6. A process as claimed in claim 1, wherein the volatile organic fluid is dichlorodifluoromethane.
7. A process as claimed in claim 1, wherein the volatile organic fluid is a mixture of pentane and dimethylbutane.
8. A foamable substantially amorphous isotactic vinyl aromatic polymer having integrated therewith from about 2 to about 12 percent by weight of a volatile organic fluid selected from the group consisting of aliphatic and cycloaliphatic hydrocarbons, aliphatic and cycloaliphatic haloaliphatic hydrocarbons containing at least one fluorine atom in the molecule and mixtures thereof, boiling below 100° C. at 760 millimeters of Hg absolute pressure and in which said polymer is insoluble.
9. A foamable substantially amorphous isotactic vinyl aromatic polymer as claimed in claim 8, wherein said polymer is isotactic polystyrene.
10. A foamable substantially amorphous isotactic vinyl aromatic polymer as claimed in claim 8, wherein the volatile organic fluid is pentane.

References Cited
UNITED STATES PATENTS

| | | |
|---|---|---|
| 2,950,261 | 8/1960 | Buchholtz et al. |
| 2,983,692 | 5/1961 | D'Alelio. |
| 3,001,954 | 9/1961 | Buchholtz et al. |
| 3,138,478 | 6/1964 | Hedman et al. |

SAMUEL H. BLECH, *Primary Examiner.*

M. FOELAK, *Assistant Examiner.*

U.S. Cl. X.R.
260—29.6, 93.5